US006721468B2

(12) United States Patent
Wood et al.

(10) Patent No.: US 6,721,468 B2
(45) Date of Patent: Apr. 13, 2004

(54) RESONANTLY DRIVEN FIBER POLARIZATION SCRAMBLER

(75) Inventors: Christopher S. Wood, Boulder, CO (US); Terry J. Brown, Lafayette, CO (US); Jason R. Ensher, Lafayette, CO (US)

(73) Assignee: ILX Lightwave Corporation, Bozeman, MT (US)

( * ) Notice: Subject to any disclaimer, the term of this patent is extended or adjusted under 35 U.S.C. 154(b) by 0 days.

(21) Appl. No.: 10/165,697

(22) Filed: Jun. 7, 2002

(65) Prior Publication Data

US 2002/0191883 A1 Dec. 19, 2002

Related U.S. Application Data

(60) Provisional application No. 60/296,839, filed on Jun. 8, 2001.

(51) Int. Cl.[7] ................................. G02B 6/00
(52) U.S. Cl. .......................................... 385/11
(58) Field of Search .......................... 385/1–3, 9, 10, 385/11

(56) References Cited

U.S. PATENT DOCUMENTS

| 3,625,589 A | 12/1971 | Snitzer |
| 3,645,603 A | 2/1972 | Smith |
| 4,384,760 A | 5/1983 | Alferness |
| 4,466,699 A | 8/1984 | Drossler et al. |
| 4,474,424 A | 10/1984 | Wagner |
| 4,550,975 A | 11/1985 | Levinson et al. |
| 4,564,289 A | 1/1986 | Spillman, Jr. |
| 4,729,622 A | 3/1988 | Pavlath |
| 4,753,507 A | 6/1988 | DePaula et al. |
| 4,789,219 A | 12/1988 | Layne |
| 4,813,756 A | 3/1989 | Frenkel et al. |
| 4,861,136 A | 8/1989 | Stone et al. |

(List continued on next page.)

OTHER PUBLICATIONS

Hasuaki Kidoh, Yasuharu Suematsu, Fellow, IEE, and Kazuhito Furuya, "Polarization Control on Output of single–Mode Optical Fibers", Ilee Journal of Quantum electronics, vol. QE–17, No. 6, Jun. 1981, pp. 991–994.

Michiharu Nakamura and Shinji Tsuji, "Single–Mode semiconductor Injection Lasers for Optical Fiber Communications", Ilee Journal of Quantum electronics, vol. QE–17, No. 6, Jun. 1981, 4 pages.

(List continued on next page.)

*Primary Examiner*—David V. Bruce
*Assistant Examiner*—Thomas R Artman
(74) *Attorney, Agent, or Firm*—Curtis A. Vock; Lathrop & Gage L.C.

(57) ABSTRACT

The invention provides a polarization scrambler to rapidly change the state of polarization of light transmitted through a single mode fiber such that a substantial portion of the Poincare sphere is covered. A plurality of piezoelectric squeezers couple with an electronic drive. Each squeezer resonates in response to drive signals from the electronic drive to induce radial compression forces on the fiber. The drive signals remain resonant with each squeezer, at frequencies of about 100 kHz, through a feedback loop for each of the squeezers and the electronic drives. Coverage over the Poincare sphere typically occurs in less than about 100 milliseconds, and preferably less than 1 millisecond.

31 Claims, 4 Drawing Sheets

U.S. PATENT DOCUMENTS

| | | |
|---|---|---|
| 4,923,290 A | 5/1990 | Brinkmeyer et al. |
| 4,960,319 A | 10/1990 | Dankowych |
| 4,979,235 A | 12/1990 | Rumbaugh et al. |
| 4,988,169 A | 1/1991 | Walker |
| 5,004,312 A | 4/1991 | Shimizu |
| 5,039,201 A | 8/1991 | Liu |
| 5,041,779 A | 8/1991 | Hales |
| 5,062,684 A | 11/1991 | Clayton et al. |
| 5,073,004 A | 12/1991 | Clayton et al. |
| 5,115,480 A | 5/1992 | Large |
| 5,159,481 A | 10/1992 | Maeda |
| 5,191,387 A | 3/1993 | Ichikawa et al. |
| 5,212,584 A | 5/1993 | Chung |
| 5,212,743 A | 5/1993 | Heismann |
| 5,212,745 A | 5/1993 | Miller |
| 5,251,275 A | 10/1993 | Kuriyama et al. |
| 5,283,845 A | 2/1994 | Ip |
| 5,287,214 A | 2/1994 | Robertson et al. |
| 5,336,883 A | 8/1994 | Hobby et al. |
| 5,361,155 A | 11/1994 | Chiaroni et al. |
| 5,408,545 A | 4/1995 | Lee et al. |
| 5,453,827 A | 9/1995 | Lee |
| 5,471,545 A | 11/1995 | Negami et al. |
| 5,481,402 A | 1/1996 | Cheng et al. |
| 5,561,726 A | 10/1996 | Yao |
| 5,592,314 A | 1/1997 | Ogasawara et al. |
| 5,606,439 A | 2/1997 | Wu |
| 5,612,824 A | 3/1997 | Si et al. |
| 5,619,600 A * | 4/1997 | Pohl .......................... 385/15 |
| 5,629,995 A | 5/1997 | Duck et al. |
| 5,633,959 A | 5/1997 | Niki et al. |
| 5,642,448 A | 6/1997 | Pan et al. |
| 5,657,151 A | 8/1997 | Swan et al. |
| 5,666,225 A | 9/1997 | Colbourne |
| 5,682,445 A | 10/1997 | Smith |
| 5,682,452 A | 10/1997 | Takahashi |
| 5,684,632 A | 11/1997 | Shimizu |
| 5,739,945 A | 4/1998 | Tayebati |
| 5,799,121 A | 8/1998 | Duck et al. |
| 5,903,684 A | 5/1999 | Payton |
| 5,917,626 A | 6/1999 | Lee |
| 6,005,995 A | 12/1999 | Chen et al. |
| 6,040,944 A | 3/2000 | Pan et al. |
| 6,377,350 B1 | 4/2002 | Paldus et al. |
| 6,381,022 B1 | 4/2002 | Zavracky |
| 6,480,635 B1 * | 11/2002 | Russell et al. ................ 385/11 |
| 6,480,637 B1 * | 11/2002 | Yao ............................ 385/11 |

OTHER PUBLICATIONS

R. P. Tatam, C. N. Pannell, J. D. C. Jones, and D. A. Jackson, "Full Polarization State Control Utilizing Linearly Birefringent Monomode Optical Fiber", Journal of Lightwave technology, vol. LT–5, No. 7, Jul. 1987, pp. 980–984.

Mark Johnson, "In–line fiber–optical polarization transformer", Applied Optics, vol. 18, No. 9, May 1, 1979, p. 1288–1289, Bedford MA 01730.

R. Ulrich, "Polarization stabilization on single–mode fiber", Appl. Phys. Lett. 35(11), Dec. 1, 1979, p. 840–842.

G.Walker et al., "Rugged, all–fiber endless polarization controller", Electronics Letters 24, 1988, p. 1353.

N. Walker et al., "Endless Polarization Control Using Four Fibre Squeezers", Electronics Letters 23, 1987, p. 290.

R. Noe, "Polarisation Control in Optical Communications", Electronics Letters, 1986 2 pages.

R. Noe, "Endless Polarisation Control experiment with Three Elements of Limited Birefringence Range", Electronics Letters 22, 1986, p. 1341.

W. L. Barnes, "Liquid Switch and Polarisation Controller", Electronics Letters, 1988, 3 pages.

* cited by examiner

RESONANTLY DRIVEN FIBER POLARIZATION SCRAMBLER

RELATED APPLICATIONS

This application claims priority to U.S. Provisional Application Serial No. 60/296,839, filed Jun. 8, 2001, entitled, "Resonantly Driven Fiber Polarization Scrambler and is incorporated herein by reference.

BACKGROUND OF THE INVENTION

Polarization scramblers are used in many applications relating to fiber-optic test and measurement. These scramblers typically utilize piezoelectric transducers (sometimes known as "squeezers") and provide increasing benefit with increasing speed and/or efficiency in completely generating a plurality of states of polarization (SOP) that cover a substantial portion of the Poincare sphere of polarization states. Polarization scramblers in the prior art use inefficient, high-voltage techniques to drive the piezoelectric transducers. Such techniques have several disadvantages; first and foremost, the high voltage itself is a drawback. Second, when driving a capacitive load (i.e., the piezoelectric transducers) with high voltage, the scrambler's speed of operation decreases due to bandwidth limitations.

The invention circumvents the afore-mentioned problems, in one object, by driving the piezoelectric transducers at resonant frequencies, resulting in higher-speed operation at lower voltages, as compared to the prior art. Other objects of the invention are apparent within the description that follows.

SUMMARY OF THE INVENTION

The following patents provide useful background information for the invention: U.S. Pat. Nos. 5,682,445; 5,633,959; 5,408,545; 5,159,481; 4,988,169; 4,979,235; 4,960,319; 4,923,290; 4,753,507; 4,753,507; 3,645,603; and 3,625,589. Each of the afore-mentioned patents is expressly incorporated herein by reference.

The following articles provide useful background information for the invention: M. Johnson, *In-line fiber-optical polarization transformer*, Appl. Opt. 18, p.1288 (1979); R. Ulrich, *Polarization stabilization on single-mode fiber*, Appl. Phys. Lett. 35, p. 840 (1979); Kidoh et al., *Polarization control on ouptut of single-mode optical fibers*, IEEE J. Quan. Elec. 17, p. 991 (1981); R. Alferness, *Electrooptic guided-wave device for general polarization transformations*, IEEE J. Quan. Elec. 17, p.965 (1981); Sakai et al., *Birefringence and polarization characteristics of single-mode optical fibers under elastic deformations*, IEEE J. Quan. Elec. 17, p.1041 (1981); R. Noe, *Endless polarization control in coherent optical communications*, Elec. Lett. 22, p.772 (1986); R. Noe, *Endless polarization control experiment with three elements of limited birefringence range*, Elec. Lett. 22, p.1341 (1986); N. Walker et al., *Endless polarization control using four fiber squeezers*, Elec. Lett. 23, p. 290 (1987); A. Kersey et al., *Monomode fiber polarization scrambler*, Elec. Lett. 23, p.634 (1987); Tatam et al., *Full polarization state control utilizing linearly birefringent monomode optical fiber*, IEEE J. Lightwave Tech. 5, p.980 (1987); G Walker et al., *Rugged, all-fiber, endless polarization controller*, Elec. Lett. 24, p.1353 (1988); 2×2 *Optical Fiber Polarization Switch and Polarization controller*, Elec. Lett. 24, p.1427 (1988); and S. Siddiqui, *Liquid crystal polarization controller for use in fiber communication systems*, Optical Fiber Conference Proceedings, Wed. afternoon, poster #122 (1989). Each of the afore-mentioned articles is incorporated herein by reference.

This invention of one aspect provides a fiber-based polarization scrambler. The scrambler uses multiple piezoelectric squeezers that exert radial forces on a section of single-mode optical fiber. The radial forces on the fiber change the fiber's birefringence via the photoelastic effect, which changes the SOP of light transmitted through the section of squeezed fiber. In the preferred aspect of the invention, each of the piezoelectric squeezers is excited independently at one of its resonant frequencies by an electronic drive. Each squeezer may be driven at the same or different frequencies from every other squeezer. Use of resonant frequencies in the polarization scrambler of the invention thus reduces the drive voltages required to change the SOP, and yet provides for higher speed and efficiency, as compared to prior art polarization scramblers.

In another aspect of the invention, the electronic drive controls amplitude output independently from drive frequency, for each squeezer. In a related aspect, the electronic drive controls amplitude output signals substantially independently from drive frequency, for each squeezer.

In still another aspect, the polarization scrambler of the invention creates a plurality of polarization states—sometimes referred to as coverage of the Poincare sphere. Preferably, the plurality of polarization states includes all polarization states to cover substantially all of the Poincare sphere. One measure of the effectiveness of the scrambler is the Degree of Polarization (DOP), defined in Born et al., *Principles of Optics*, 6th Edition, Pergamon Press, p.554–555 (1980):

$$DOP = \frac{\sqrt{\langle S_1 \rangle^2 + \langle S_2 \rangle^2 + \langle S_3 \rangle^2}}{S_0}$$

where the $S_i$ are components of the Stokes vector that describes the SOP at a given moment in time, and the <> indicate the average of the Stokes component over a measurement time-interval. Minimizing DOP over a measurement time interval (1/measurement bandwidth) depends on generating a plurality of polarization states within the time they are measured. In one aspect of the invention, the plurality of polarization states are produced in a time less than about 100 milliseconds, and preferably less than 1 millisecond. The DOP will be less than about 5% at a measurement bandwidth of 10 kHz. In a further aspect, the scrambler generates a pattern or sequence of polarization states; these patterns or sequences may be random or periodic in time.

The invention of one aspect provides an improvement to a polarization sensitive optical measurement system. Such a system can include, for example, polarization-dependent loss devices or polarization-mode-dispersion measuring devices. In accord with the invention, the optical measurement system incorporates a polarization scrambler, such as described above, to quickly and efficiently induce coverage across the Poincare sphere, detuning or eliminating system sensitivity to polarization effects. Those skilled in the art should appreciate that the improvement provided by the polarization scrambler of the invention can provide further enhancements to other fiber optical systems and instruments of the prior art.

In yet another aspect, the invention provides an improvement to an optical source. Such a source can include, for example, a laser diode, LED, or amplified spontaneous emission devices.

A key consideration for users of polarization scramblers within the fiber optic marketplace relates to speed of operation; since the invention provides improved operating speed over prior art polarization scramblers, the invention provides obvious advantages.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
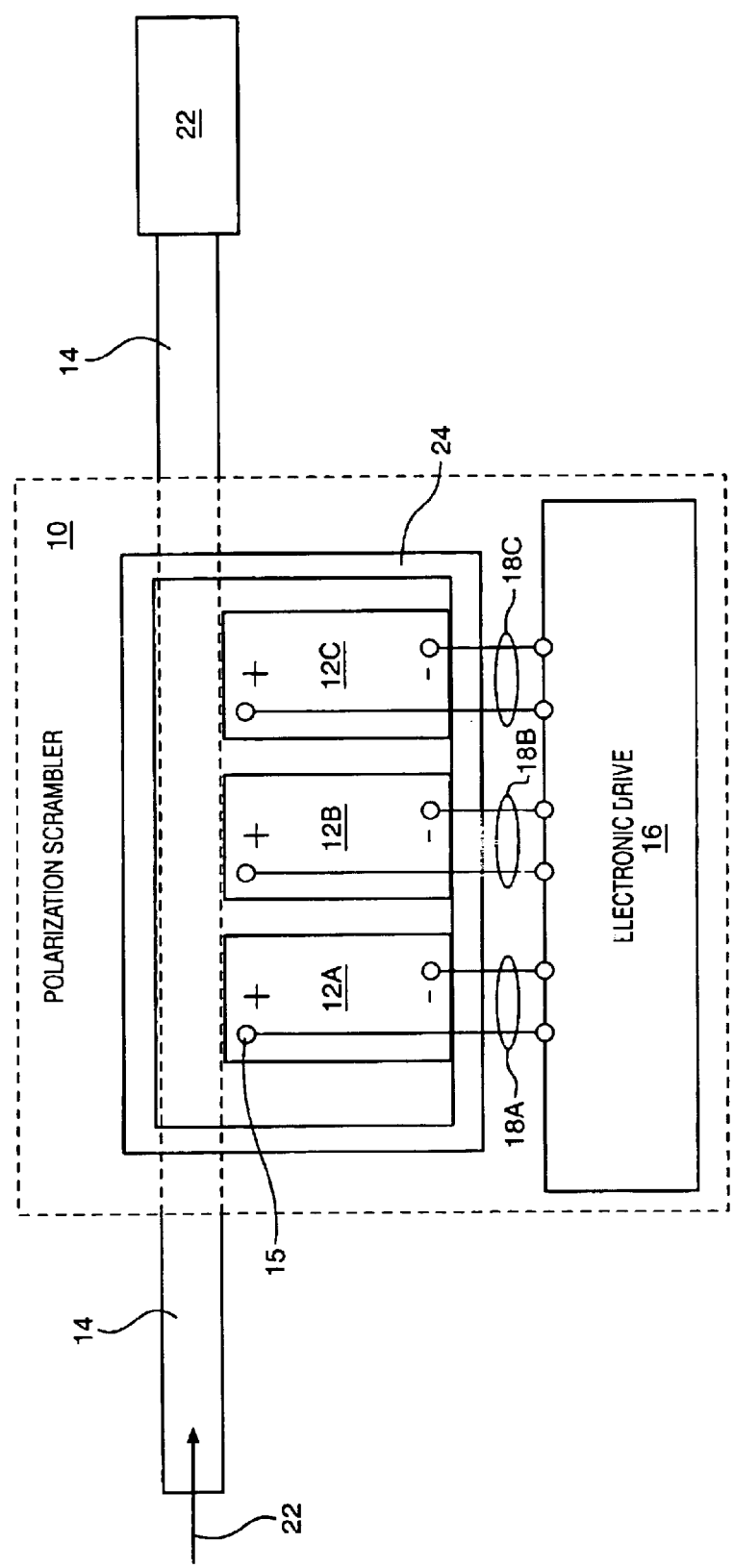
FIG. 1 shows a polarization scrambler constructed according to the invention.

FIG. 1 shows a fiber-based polarization scrambler 10 (not to scale) constructed according to the invention. Scrambler 10 includes a plurality of piezoelectric squeezers 12 arranged such that each squeezer produces a radial force, selectively, onto an optical fiber 14 passing through scrambler 10. An electric drive 16 electrically connects to each squeezer 12, via corresponding electrical pathways 18, and applies a resonant voltage across each squeezer 12 in a pre-selected magnitude, frequency and duty cycle, as described herein.

Scrambler 10 shows three squeezers 12a, 12b, 12c and three corresponding sets of electrical pathways 18a, 18b, 18c connecting squeezers 12a, 12b, 12c, respectively, to electronic drive 16. Those skilled in the art should appreciate that more or fewer squeezers 12 may be implemented within scrambler 10 without departing from the scope of the invention. Those skilled in the art should also appreciate that the arrangement of, and the electrical connections 15 to and between, electronic drive 16, pathways 18 and squeezers 12 are shown for purposes of illustration, and not in a limiting way; and that a variety of connections and transducer arrangements may be made within the scope of the invention.

In the preferred embodiment of the invention, electronic drive 16 excites each squeezer 12 at a resonant frequency. In that each squeezer 12 has a plurality of resonant frequencies, the selected resonant frequency of any one squeezer 12—as excited by electronic drive 16—may be the same or different from the resonant frequency of any other squeezer 12. A housing 24 illustratively surrounds squeezers 12 so as to leverage compression forces between squeezers 12 and fiber 14. Electronic drive 16 also preferably controls voltage amplitude applied to each squeezer 12 independently from the drive frequency used to attain resonance. Essentially, it is desirable in most embodiments of the invention to drive each squeezer 12 through its full range of physical motion, as quickly as possible, to achieve the benefits of polarization scrambling according to the teachings herein.

In operation, application of force onto fiber 14 by any squeezer 12 alters the polarization properties of fiber 14. Electronic drive 16 excites the plurality of squeezers 12 in a manner so as to substantially eliminate polarization effects of electromagnetic energy 22 transmitted through fiber 14 to downstream electro-optical systems, devices or components 22. Specifically, by driving squeezers 12 independently with a random or periodic pattern or sequence, fiber 14 experiences a plurality of polarization states to cover the Poincare sphere over a short time interval, e.g., less than one hundred milliseconds, and preferably less than one millisecond.

Figure 2:
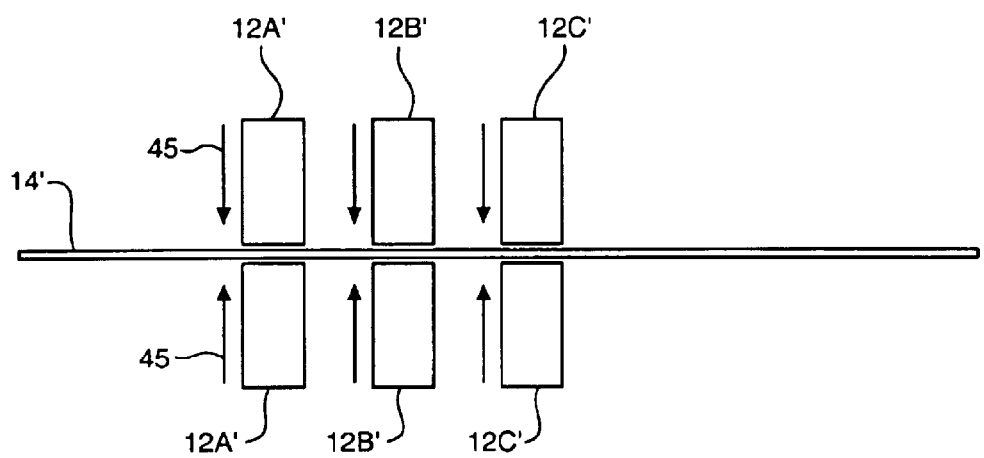
FIG. 2 shows a serial array of fiber squeezers applying radial compression forces onto a fiber, according to the invention.
Figure 3:
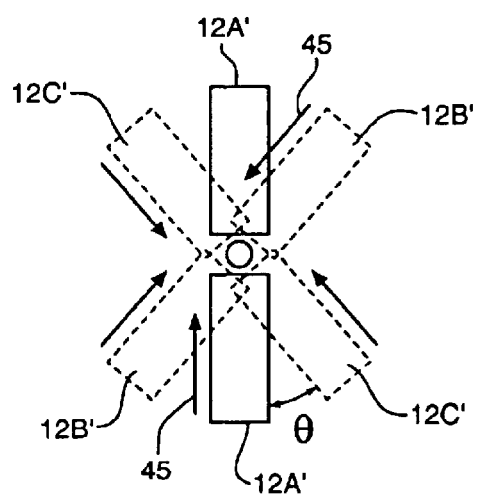
FIG. 3 shows an end view of the squeezers of FIG. 2.

The design and construction of squeezer 12 may be made in accord with U.S. Pat. No. 4,753,507, incorporated herein by reference. Preferably, a fixed angular relationship exists between any two adjacent squeezers 12, optimally at an angle of about forty-five degrees between any two adjacent squeezers (e.g., squeezers 12a, 12b and squeezers 12b, 12c). FIG. 2 illustrates three fiber squeezers 12' constructed and arranged to independently apply radial compression forces 45 on single mode fiber 14'. As shown in FIG. 3, squeezers 12' apply these forces onto fiber 14' with circumferential offset angles ($\theta$) between adjacent squeezers of zero degrees, sixty degrees and minus sixty degrees. Other angular arrangements of squeezers 12' may also be made, in accord with the invention, such as 0 degrees, forty-five degrees, and minus forty-five degrees. Squeezers 12' thus represent three variable retarders, in series, along fiber 14'. Like FIG. 1, squeezers 12' scramble polarizations along the Poincare sphere. Squeezers 12' may be manually controlled to reach practically any polarization state. Squeezers 12' can include piezoelectric transducers electrically excited to apply compression forces 45, as shown.

Electronic drive 16 electrically excites squeezers 12 at a frequency of at least about 100 kHz. Although lower frequencies may be used, frequencies such as 100 kHz permit high speed and efficiency in covering the Poincare sphere, and minimize the DOP at high bandwidths, such as 10 kHz. Accordingly, electronic drive 16 utilizes a electronic feedback loop to appropriately match an individual squeezer's mechanical or electrical resonance. By way of example, as described in connection with FIG. 4, the feedback loop of drive 16 may include a phase-locked loop ("PLL") with a voltage-controlled oscillator ("VCO").

Figure 4:
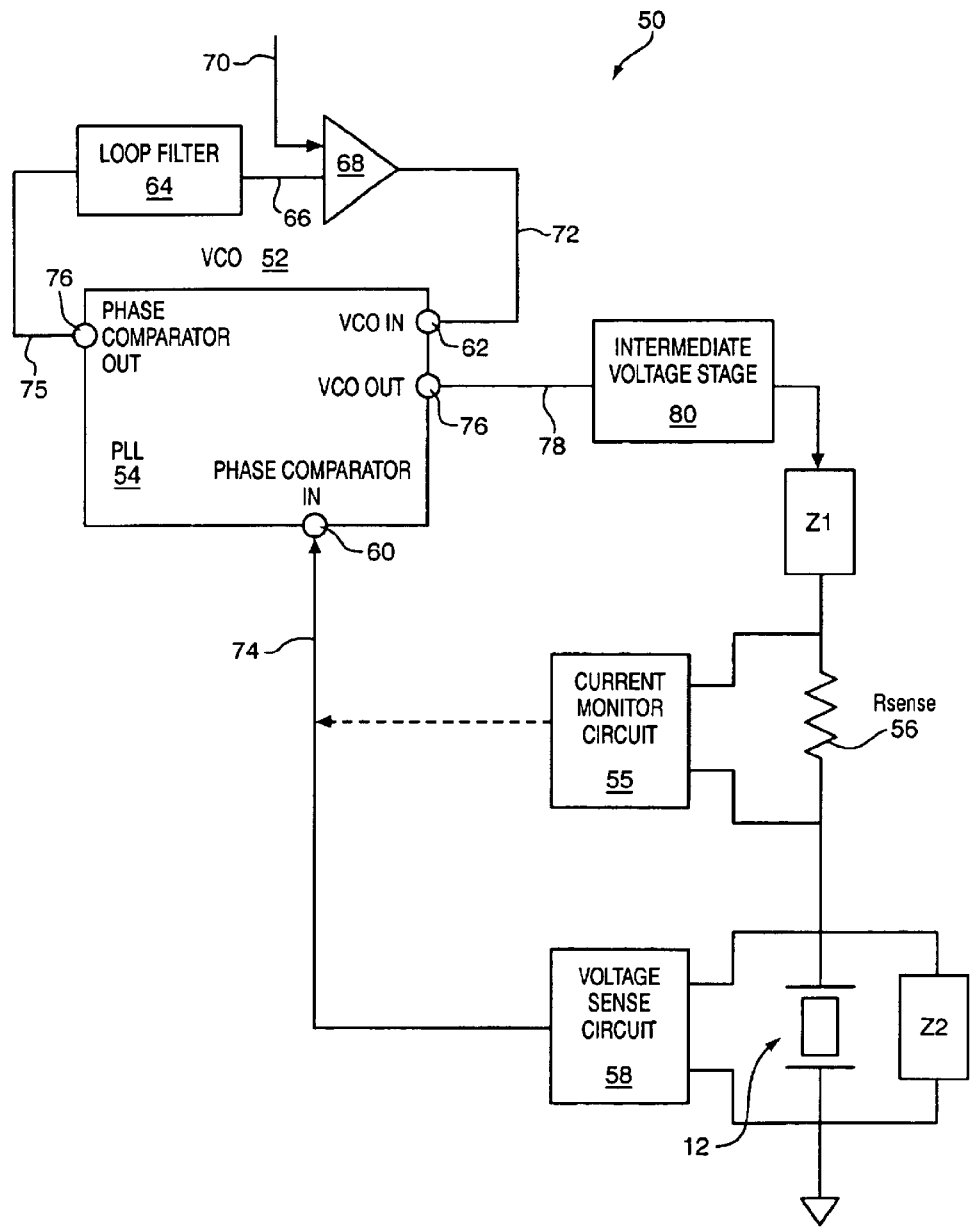
FIG. 4 schematically illustrates one circuit suitable for driving a piezoelectric squeezer in accord with the invention.

FIG. 4 shows a schematic of one electronic circuit 50 illustrating an electrical and feedback relationship between drive 16 and one squeezer 12 of FIG. 1. A VCO 52 is integral with a PLL 54 to produce an oscillatory voltage across piezoelectric squeezer 12. The frequency of the oscillation is chosen to be at or near to one of the mechanical or electrical resonance frequencies of squeezer 12. The oscillatory voltage response of squeezer 12 is also measured by one of two alternative techniques, both shown in FIG. 2 for purpose of illustration. In a first technique, a sense voltage proportional to the squeezer's drive current, determined by current monitor circuit 55, is measured across a sense resistor 56 in series with squeezer 12. In a second technique, a voltage sense circuit 58 measures a voltage across squeezer 12. In either technique, a voltage 74 indicative of oscillatory voltage of squeezer 12 is fed to the phase comparator input 60 of PLL 54. The phase error between the VCO drive voltage 78 at VCO Output 76 and voltage 74 at input 60 is sent to loop filter 64, which integrates, phase shifts and/or amplifies the error signal over a defined bandwidth. The output 66 of loop filter 64 is summed at junction 68 with an adjustable DC voltage 70, which provides a VCO center frequency adjustment to VCO In 62 in the absence of an error signal 75. PLL 54 adjusts the frequency difference until the phase error is zero, represented by phase error signal 75 at PLL Comparator Out 76. When the phase difference between drive voltage 78 and sense voltage 74 is at or near to zero, squeezer 12 is driven at or near to resonance. VCO Out 76 provides the input to the feedback section with squeezer 12; preferably, a high current (e.g., less than or equal to 1A), intermediate voltage stage 80 electronically couples output 78 to squeezer 12.

PLL 54 may for example be a microchip of common design, including the 0 or 90 degree feedback PLL. However, the PLL can also be constructed through discrete components, as known in the art. Those skilled in the art should also appreciate that the functions of PLL 54 may be implemented with a frequency lock circuit, such as those using modulating/demodulating techniques, or with a self-resonant circuit. The feedback to PLL 54 may further derive from signals generated from additional squeezers 12 or other devices.

One practical concern is the maintaining of phase lock in the event that the squeezer resonance changes, such as caused through thermal or mechanical stresses. As known to those skilled in the art, passive insulation measures may be used to isolate the squeezer from these external stresses during the feedback operation. Alternatively, active temperature monitoring and control of squeezer 12 or other components 54, 64, 55, 58 may help reduce resonance variations. Thermistors or RTD devices may be used to monitor temperature; resistive heaters or Peltier devices may be used to control temperature. Preferably, circuit 50 includes circuit elements that decrease the resonant Q-factor, such that the squeezer is less sensitive to changes in the resonance frequency, without substantially altering frequency response. Optionally, therefore, circuit element Z1 is included to increase the damping of circuit 50; element Z1 can for example include inductors and resistors in series. Circuit element Z2, representing an inductor in parallel with squeezer 12, may also be optionally included to resonate at frequency $(LC)^{-1/2}$, defined by internal L, C components, which is at or near to the mechanical resonance of squeezer 12; this further broadens the resonant response of circuit 50 for a given amplitude. Alternatively, L and C may be chosen at frequencies far from a mechanical resonance, thereby creating a purely electrical resonance whose frequency and Q-factor are dictated by the impedances of the squeezer and of elements Z1 and Z2. Those skilled in the art should appreciate that elements Z1, Z2 may include inductors, capacitors, resistors, transistors, op amps, diodes and/or other electrical components as a matter of design choice to provide like functionality.

Figure 5:
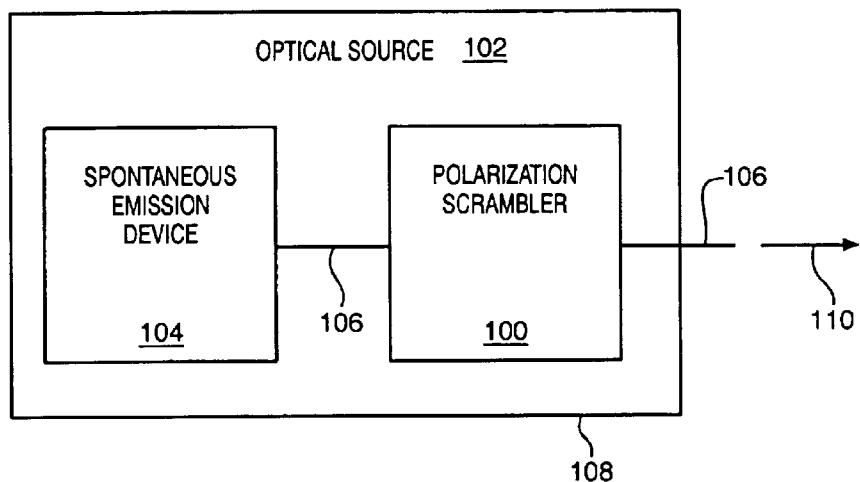
FIG. 5 shows a polarization scrambler optionally arranged in the improvement of optical sources, in accord with the invention.

FIG. 5 illustrates how a polarization scrambler 100 of the invention may be used in the improvement of an optical source 102. By way of example, an optical source 102 with a laser, diode or a spontaneous emission device 104 is coupled with scrambler 100 via a single mode fiber 106. Scrambler 100 processes electromagnetic energy from driver 104, through fiber 106, to produce electromagnetic energy 110 whose polarization state is substantially and rapidly modulated in time. Scrambler 100 may be made integral with the housing 108 of source 102 to provide a compact optical source for generating polarization-scrambled optical energy.

Figure 6:
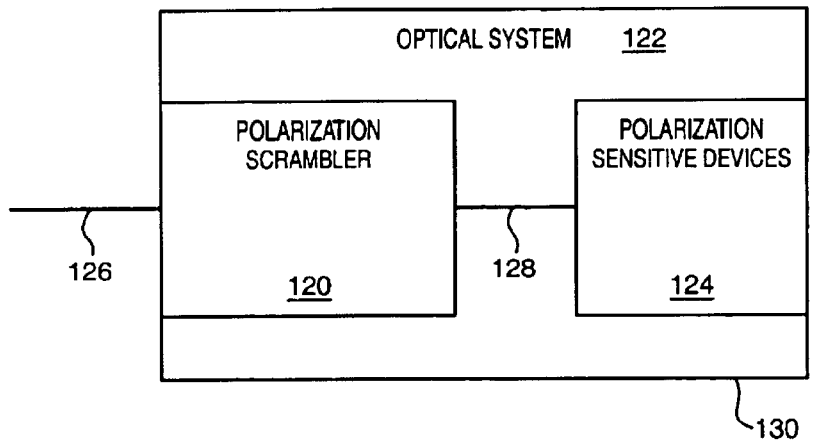
FIG. 6 shows a polarization scrambler optionally arranged in the improvement of polarization sensitive optical systems or devices, in accord with the invention.

FIG. 6 illustrates how a polarization scrambler 120 of the invention may be used in the improvement of a polarization-sensitive optical system 122. By way of example, system 122 may include one or more polarization-dependent loss or polarization-mode-dispersion devices 124. A fiber 126 accepts electromagnetic inputs to system 122, and scrambler 120 processes the inputs to provide a substantially polarization-scrambled signal 128 to devices 124. As appropriate, scrambler 120 may be made within the housing 130 of system 122 so as to provide a modular package for users of system 122.

The invention thus attains the objects set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

Having described the invention, what is claimed is:

1. A polarization scrambler for electromagnetic energy through an optical fiber, comprising:

a plurality of piezoelectric squeezers and an electronic drive, each squeezer resonating in response to drive signals from the electronic drive to induce radial compression forces onto the fiber, wherein output polarization state of electromagnetic energy from the scrambler, averaged over a test time period of less than about 100 milliseconds, is substantially non-polarized.

2. A scrambler of claim 1, wherein at least one squeezer resonates at a mechanical resonance frequency.

3. A scrambler of claim 1, wherein at least one squeezer oscillates at a resonance frequency determined by the electronic drive and the squeezer.

4. A scrambler of claim 1, wherein the plurality of squeezers comprise three squeezers arranged serially along a portion of the fiber, each squeezer applying the radial compression forces onto the fiber at a circumferential offset angle relative to any adjacent squeezer.

5. A scrambler of claim 4, wherein the circumferential offset angle is 45 degrees.

6. A scrambler of claim 4, wherein the circumferential offset angle is 60 degrees.

7. A scrambler of claim 1, wherein the electronic drive excites each squeezer with a controlled RMS voltage amplitude at a selected frequency.

8. A scrambler of claim 1, wherein the optical fiber comprises a single mode fiber.

9. A scrambler of claim 1, wherein the optical fiber comprises a multi-mode fiber.

10. A scrambler of claim 1, wherein the electronic drive provides excitation signals to at least one squeezer in a random duty cycle.

11. A scrambler of claim 1, wherein the electronic drive provides excitation signals to at least one squeezer in a periodically varying duty cycle.

12. A polarization scrambler for electromagnetic energy through an optical fiber, comprising:

a plurality of piezoelectric squeezers having a resonant frequency of at least about 10 kHz, and an electronic drive, each squeezer resonating in response to drive signals from the electronic drive to induce radial compression forces onto the fiber, wherein output polarization state of electromagnetic energy from the scrambler, averaged over a test time period, is substantially non-polarized.

13. A polarization scrambler for electromagnetic energy through an optical fiber, comprising:
a plurality of piezoelectric squeezers and an electronic drive, each squeezer resonating in response to drive signals from the electronic drive to induce radial compression forces onto the fiber, wherein the electronic drive and squeezers cooperate to invoke a plurality of polarization states that substantially cover the Poincare sphere in less than about 1 millisecond, and wherein output polarization state of electromagnetic energy from the scrambler, averaged over a test time period, is substantially non-polarized.

14. A polarization scrambler for electromagnetic energy through an optical fiber comprising:
a plurality of piezoelectric squeezers and an electronic drive, each squeezer resonating in response to drive signals from the electronic drive to induce radial compression forces onto the fiber, wherein the electronic drive and squeezers cooperate to invoke a plurality of polarization states that substantially cover the Poincare sphere in less than about 100 milliseconds, and wherein output polarizatiion state of electromagnetic energy from the scrambler, averaged over a test time period, is substantially non-polarized.

15. A polarization scrambler for electromagnetic energy through an optical fiber, comprising:
a plurality of piezoelectric squeezers and an electronic drive, each squeezer resonating in response to drive signals from the electronic drive to induce radial compression forces onto the fiber, wherein output polarization state of electromagnetic energy from the scrambler, averaged over a test time period of less than about 1 millisecond, is substantially non-polarized.

16. A polarization scrambler for electromagnetic energy through an optical fiber, comprising:
a plurality of piezoelectric squeezers and an electronic drive, each squeezer resonating in response to drive signals from the electronic dirve to induce radial compression forces onto the fiber, wherein the electronic drive and squeezers cooperate to invoke a plurality of polarization states providing a degree of polarization, output from the scrambler, that is less than about 5% when measured over a test time period of less than about 100 msec.

17. A polarization scrambler for electromagnetic energy through an optical fiber, comprising:
a plurality of piezoelectric squeezers and an electronic drive, each squeezer resonating in response to drive signals from the electronic drive to induce radial compression forces onto the fiber, wherein the electronic drive and squeezers cooperate to invoke a plurality of polarization states providing a degree of polarization, output from the scrambler, that is less than about 5% when measured over a test time period of less than about 1 msec.

18. A method of scrambling polarizations through a fiber receiving compression forces from a plurality of piezoelectric squeezers, comprising the steps of:
generating one or more oscillating signals that induce vibrations in each of the squeezers, sensing feedback signals representative of the vibrations, and
coupling the oscillating signals with the feedback signals in a feedback control loop stabilizing vibrations of at least about 10 kHz in each of the squeezers.

19. A method of claim 18, wherein the step of generating one or more oscillating signals comprises utilizing one or more voltage controlled oscillators.

20. A method of claim 18, wherein the step of coupling the oscillating signals with the feedback signals comprises utilizing a phase-locked loop.

21. A method of claim 18, wherein the step of coupling the oscillating signals with the feedback signals comprises utilizing a frequency lock circuit.

22. A method of claim 18, wherein the step of coupling the oscillating signals with the feedback signals comprises utilizing a self-resonant circuit.

23. A method of claim 18, wherein the step of sensing feedback signals comprises sensing drive current of each squeezer, measured across a resistor in series with the squeezer.

24. A method of claim 18, wherein the step of sensing feedback signals comprises determining a voltage across the squeezer.

25. A method of claim 18, wherein the step of coupling the oscillating signals with the feedback signals comprises comparing phases of the signals through a phased-lock loop, and further comprising generating an error signal, indicative of phase error, to drive the feedback control loop to stable resonance.

26. A method of claim 25, further comprising adding a DC voltage to the error signal to provide a VCO center frequency.

27. In an optical source generating electromagnetic energy in an optical fiber, the improvement comprising:
a polarization scrambler having a plurality of piezoelectric squeezers and an electronic drive, each squeezer resonating in response to drive signals from the electronic drive to induce radial compression forces onto the fiber, wherein a polarization state of output electromagnetic energy from the source is substantially non-polarized over a test time period less than about 100 milliseconds.

28. In an optical source generating electromagnetic energy in an optical fiber, the improvement comprising:
a polarization scrambler having a plurality of piezoelectric squeezers and an electronic drive, each squeezer resonating in response to drive signals from the electronic drive to induce radial compression forces onto the fiber, wherein a polarization state of output electromagnetic energy from the source is substantially non-polarized over a test time period less than about 1 millisecond.

29. In a source of claim 28, the improvement comprising one of a laser, diode or spontaneous emission source for generating the energy.

30. In a polarization sensitive optical system receiving electromagnetic energy from an optical fiber, the improvement comprising:
one or more polarization sensitive devices, a polarization scrambler having a plurality of piezoelectric squeezers, and an electronic drive, each squeezer resonating in response to drive signals from the electronic drive to induce radial compression forces onto the fiber, wherein an output polarization state of the electromagnetic energy coupled to the devices is substantially non-polarized over a test time period of less than about 100 milliseconds.

31. In an optical system of claim 30, the improvement wherein the test time period is less than about 1 millisecond.

* * * * *